Figure 1:
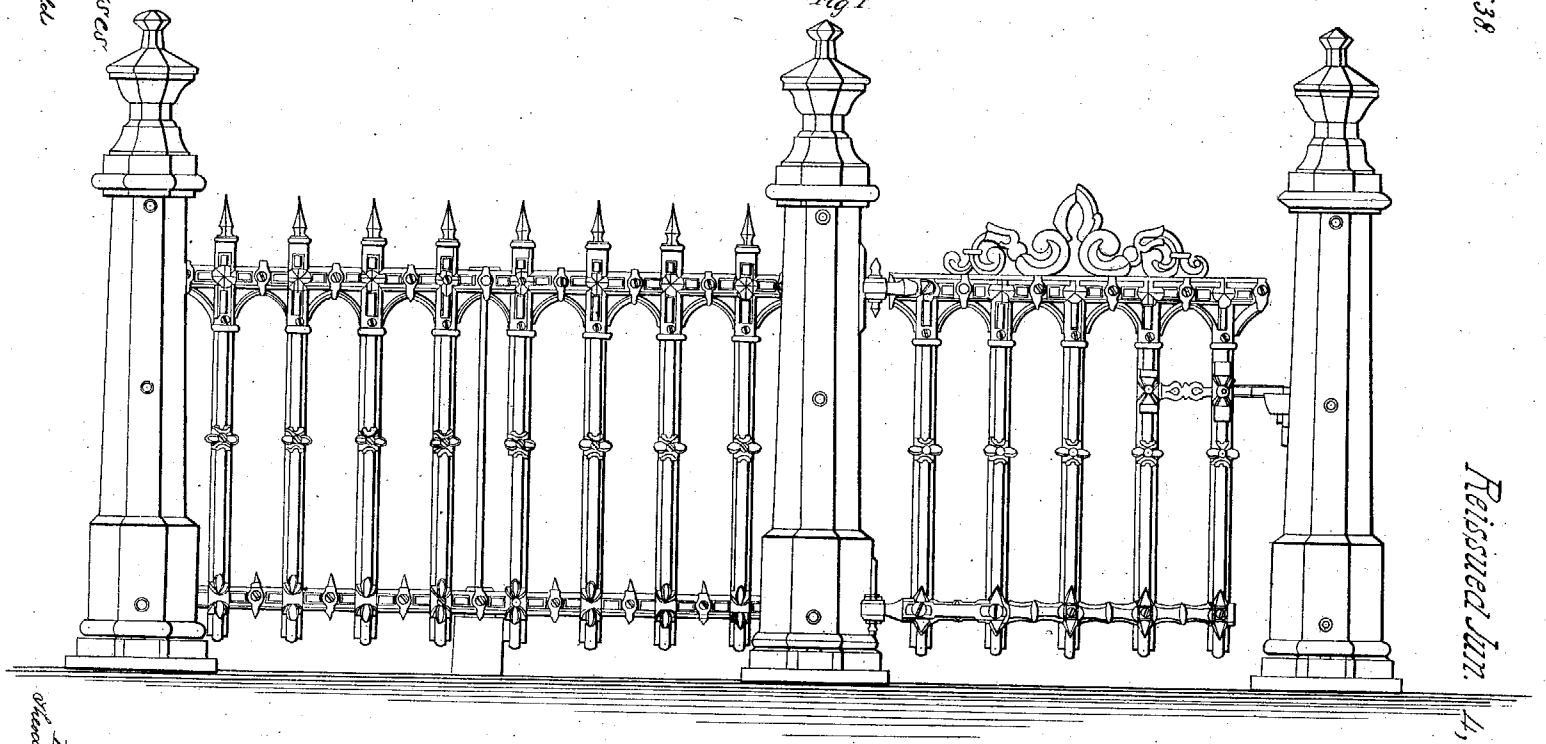

T. E. King.

Sheet 1, 2 Sheets.

Iron Fence.

No. 2,638.

Reissued Jun. 4, 1867.

Witnesses.
J. F. Quigle
A. Schild

Inventor.
Theodore E. King.

N. PETERS, PHOTO-LITHOGRAPHER, WASHINGTON, D. C.

Sheet 2, 2 Sheets.
T. E. King.
Iron Fence.
No. 2,638. Reissued Jun. 4, 1867.
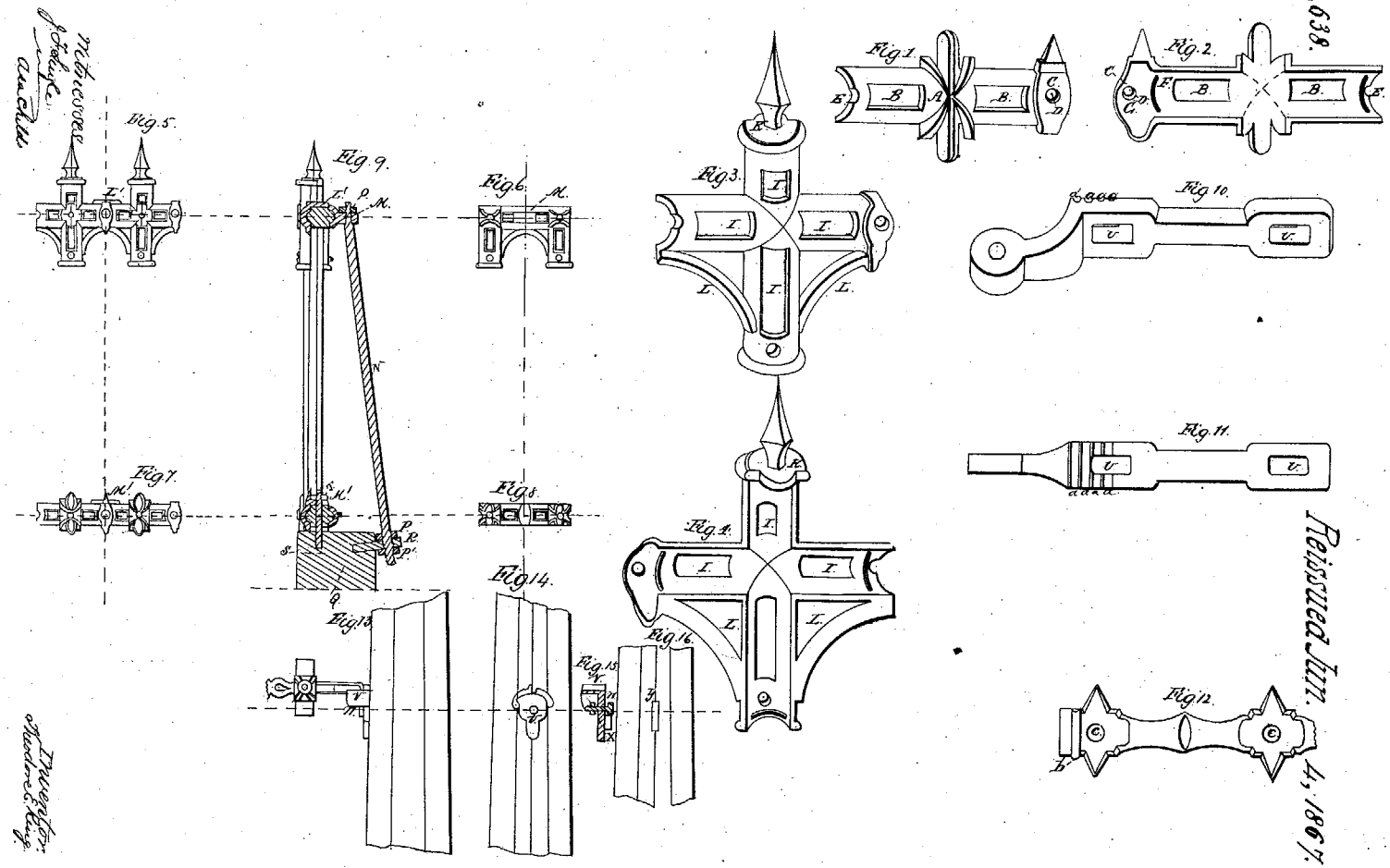
Witnesses
J. Hoople
A. A. Childs
Inventor
Theodore E. King.
N. PETERS, PHOTO-LITHOGRAPHER, WASHINGTON, D. C.

UNITED STATES PATENT OFFICE.

THEODORE E. KING, OF PAINESVILLE, OHIO.

FENCE.

Specification forming part of Letters Patent No. 55,874, dated June 26, 1866; Reissue No. 2,638, dated June 4, 1867.

*To all whom it may concern:*

Be it known that I, THEODORE E. KING, of Painesville, in the county of Lake and State of Ohio, have invented certain new and useful Improvements in Fences for Lawns, Door-Yards, &c.; and I do hereby declare that the following is a full and exact description thereof, reference being had to the accompanying drawings, in which—

Figure 1, Plate 1, is a longitudinal elevation of my improved fence, representing a panel and a foot-gate and posts for supporting the same. Figs. 1 and 2, Plate 2, are perspective views, on an enlarged scale, of one of the series of straps or plates employed for stiffening or strengthening the rail, Fig. 1 being the outside and Fig. 2 the inside of the same; Figs. 3 and 4, perspective views of a similar plate with a vertical addition to its horizontal construction and with arched bracing, intended for supporting the picket and bracing the rail, Fig. 3 being the outside and Fig. 4 the inside; Fig. 5, elevation of "plates," cast two in one and used for covering and strengthening the joining ends of the sections; Fig. 6, elevation of a plate used at the back of the rail opposite the foregoing, and constructed with a projection to receive a bracing-rod. Figs. 7 and 8 are elevations of plates used on the lower rails, Fig. 7 being the front and Fig. 8 the back. Fig. 9 is a sectional end view of a panel, showing the mode of securing the ends of the sections, as will be explained; Figs. 10 and 11, enlarged views of the adjustable bottom hinge of the gate; Fig. 12, a portion of the plating of the lower rail of the gate which receives said hinge. Figs. 13, 14, 15, and 16 are details showing the arrangement of the adjustable catch for the latch of the gate, Fig. 15 being a vertical section, the construction and operation of which will be hereinafter explained.

I am aware that it is not new to employ plates or straps of iron or other metal to stiffen or strengthen various forms of wood structures, which would be otherwise weak from its slender construction; but the nature and distinguishing features of my improvements relate to the mode of strengthening, supporting, and uniting the rails and pickets by employing a series of iron straps or plates of peculiar construction cast separately or two or more together, and so securing them to the rails and pickets by overlapping or interlocking, or otherwise affixed, so to render the rails rigid, thus preventing any tendency to "sag" or depress, at the same time counteracting strain in a lateral direction, the picket being also supported vertically. The plates will also present an ornamental design throughout the whole length of the fence, panel, and gate, and in case of breaking or injury to the picket or plate the injured parts are easily removed and new replaced. This arrangement, it will be seen, does away with the use of the objectionable and expensive "bottom board" or paneling employed in other "combination" fences to render them durable, and presents the light, open, and elegant appearance so much desired.

The secondary feature of my improvements is the arrangement for adjusting the plumb of the gate and catch of the latch, the former consisting of a hinge so constructed as to be easily and readily moved in or out at any time the gate requires to be reset, the catch being adjusted up or down to correspond.

The third feature of my said improvement is the means adopted for coupling and securing the sections to form the panels.

The following is a description of the construction of the several parts employed in my said improvements:

A, Fig. 1, Plate 2, is a cast-iron strap or plate, convex outward and concave inward. This plate may be so formed as to fit any conformation of the rail and picket desired. It is made as thin and light as will be consistent with the strength required.

B B are open spaces cut out from the body, principally to reduce weight of metal. C is its raised portion, through which is a hole, D. On its opposite end is a half-round notch, E.

F F, Fig. 2, are raised edges on the concave side, as seen, formed at the extremities.

G is the inside of the raised portion C, Fig. 1, and is sunk below the longitudinal line of the cavity, as shown.

Fig. 3 is another plate, its horizontal portion being constructed substantially like the preceding. The vertical or upright portion is also convex and concave correspondingly, the lower part perforated with a hole, H, and openings I I are cut out, as in the other. It is also provided with a raised edge, J, Fig. 4. The cap K projects back, so as to cover the head of the picket, as seen. L L, Fig. 3, are two arched braces, uniting the upright with the horizontal portion.

Fig. 5 are two of the last-described plates cast in one piece, and has a plate, L, on its top projecting back, and Fig. 7 two of the first-described, also cast in one piece, and has a similar plate, M′. These projecting plates are intended for covering and securing the joining ends of the sections, as will be explained.

The plates, Figs. 6 and 8, are placed on the back of the sections, opposite the plates numbered 5 and 7, respectively. These last-named plates need no particular description, only that plate 6 is provided with a projection, M, having a hole through which the top of the long brace N, hereinafter mentioned, is put. N, Fig. 9, is the said brace. Its upper end is cut with a thread to receive a nut, O. The lower end is similarly cut, and has two nuts, P and P′.

Q is a block of stone set endwise in the ground. It has two bolts leaded into it—R, which is an eyebolt, and S a straight bolt provided with a thread and a nut, T.

Fig. 10 will show the general construction of the gate-hinge, or that portion relating to its adjustable feature. *a a a a* are depressions into which the tooth *b* (shown on a portion of the lower plating of the gate and marked Fig. 12) drops. Said plating has also two screw-holes, *c c*, for the adjusting-screws of the said hinge. Fig. 11 exhibits the said depressions more fully. U U, Fig. 10, are slots into which the set-screws pass, as seen in Plate 1.

V, Fig. 13, is the adjustable catch before referred to. Fig. 15, the sectional view, shows its constructive form. W is a bolt passing through it, and X a stud projecting from its back.

Fig. 16 shows an opening, Y, formed by notching the halves of the post.

I will now explain the method of making up the sections of my said improved fence. Two pieces of pine or other suitable wood, dressed, eight feet long, three and one-half inches wide, and one and one-half inch thick, more or less, as the nature of the case may require, are notched out on their front edges at intervals of about six inches from center to center to receive the pickets.

The pickets may be of any suitable length or form, and placed in the said notches. The pickets may be also notched or not, as found expedient in fitting the picket to the rails, the distance between the top and bottom rails being in proportion to the height of the fence. The pickets are then placed in the notches formed in the rails, and the plates are then so laid on as to cover the intersection of the picket with the rail, and then secured in place. These plates may overlap the preceding one by its raised part C, Fig. 1, Plate 2, and screwed down firmly through hole D, as seen in Fig. 1, Plate 1. The said plates may otherwise interlock in series, or affixed to the rails in separate plates by any suitable means. The other plates are put on in like manner until the section is filled, the extreme ends which enter the posts being left so that shorter pieces can be put on when the fence is set up. The joining ends of the sections are also left implanted until then for the purpose of putting on the double plates, Figs. 5 and 7, when coupling the said sections.

In the operation of plating it will be observed that in screwing on the plates the knife-edge projections F F, Fig. 2, cut or bite into the wood, thus giving each plate a firmer hold. The plates of the upper rail are put on in like manner, excepting that there is an additional screw on its lower end, which goes into the picket, as seen.

The plating of the gate, if deemed best, can be cast in entire pieces fitting the width. It can also be additionally strengthened by entire plates at the back, the ornamental portion of the front plating corresponding of course to the entire ornamental design. Thus much of the work and the ornaments on the middle line of the pickets, as seen in the front elevation, Plate 1, can be accomplished at the factory, the sections being made up in varying lengths, so as to meet any contingency that may arise from the space of the ground to be fenced, rendering it convenient for transportation.

In putting up the fence it will be noticed that the ends of the sections are supported through apertures in the sides of the posts, the posts being in halves, and the part designed to receive the ends of the sections notched out to fit the form of the rail, whatever it may be. Previous to being put through, however, the short pieces of plating are put on. The middle of the sections is now ready for the plating. The ends, as will be observed, abut against each other. The double plate, Fig. 5, is then secured in its place, its projecting plate L covering the joint, as seen. The double plate, Fig. 7, is then secured in like manner, its projecting plate M′ covering the joint, as shown. The back plates, 6 and 8, are put in their respective places and secured by bolts passed through the front plates. One of these bolts is shown in the upper part of Fig. 9. The screw-bolt S, Fig. 9, it will be seen, comes between the abutting ends of the lower rail and through the projecting plate M′, and is secured by the nut T, a plate being interposed between said rail and top of the stone, as seen in Fig. 9. The brace N, with the nut P at its bottom screwed on, is put through the eye-bolt R, its upper part passed through the projecting plate M of the back plate, Fig. 6, and the nut O put on and screwed tight. After the panel is made plumb the nuts P and P′ are screwed tight to the said eye-bolt. It will be seen that if at any time the panel gets out of line it can be adjusted very readily by lowering or raising said nuts.

The mode of adjusting the gate is sufficiently obvious, as it is only necessary to loosen the screws and shift the hinge until the gate hangs level. The mode of adjusting the catch is also obvious, the screw-bolt W, Fig. 15, being loosened for the purpose.

What I claim as my improvement, and desire to secure by Letters Patent, is—

1. The plate C, when used in correlation to the picket and rail, either in series or singly, with its intaglio surface corresponding to the conformation of the said picket or rail, substantially as and for the purpose set forth.

2. Strengthening the fence-panels and uniting the pickets and rails thereof by means of plates or sets of plates, Figs. 3 and 5, and so arranged at right angles to the picket and rail, and in combination therewith the said plates shall form a series of supports to the panel-sections, substantially as specified.

3. The plate, Fig. 3, or its equivalent, when so arranged in relation to the rail that the said plate shall form an extension of the picket above, and constitute a brace or support for the fence-panel, in conjunction with the picket and rail, substantially as set forth.

4. The adjustable hinges constructed with the depressions *a a a a* and slots U U, substantially as shown in Figs. 10 and 11, in combination with the tooth *b*, and screw-holes *c c* of the lower plating of the gate, as herein described, and for the purpose specified.

5. The adjustable catch, as shown in Figs. 14 and 15, provided with the screw-bolt W and stud X, in combination with the opening Y of the post, and constructed and arranged as and for the purpose set forth.

T. E. KING.

Witnesses:

FRANKLIN PAINE, Jr.,

E. HUNTINGTON.